United States Patent
Batten et al.

(10) Patent No.: US 6,282,585 B1
(45) Date of Patent: Aug. 28, 2001

(54) COOPERATIVE INTERCONNECTION FOR REDUCING PORT PRESSURE IN CLUSTERED MICROPROCESSORS

(75) Inventors: Dean Batten, Allentown, PA (US); Paul Gerard D'Arcy, Alpharetta, GA (US); C. John Glossner, Allentown, PA (US); Sanjay Jinturkar; Kent E. Wires, both of Bethlehem, PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/274,134

(22) Filed: Mar. 22, 1999

(51) Int. Cl.[7] .................................................. G06F 13/14
(52) U.S. Cl. ................................ 710/5; 710/20; 712/225
(58) Field of Search ..................... 712/33, 225; 710/5, 710/20, 21

(56) References Cited

U.S. PATENT DOCUMENTS

| | | | |
|---|---|---|---|
| 4,200,930 | * | 4/1980 | Rawlings .............................. 709/212 |
| 5,193,187 | * | 3/1993 | Strout ................................... 710/261 |
| 5,581,777 | * | 12/1996 | Kim ........................................ 712/16 |
| 5,649,135 | * | 7/1997 | Pechanek ............................ 712/200 |
| 5,754,781 | * | 5/1998 | Kitta ....................................... 712/43 |
| 5,948,062 | * | 9/1999 | Tzelnic ................................. 709/219 |
| 5,974,523 | * | 10/1999 | Glew ...................................... 712/23 |
| 6,012,059 | * | 1/2000 | Neimat ..................................... 707/8 |
| 6,163,855 | * | 12/2000 | Shrivastava ............................. 714/4 |

OTHER PUBLICATIONS

D.A. Patterson et al., "Computer Architecture: A Quantitative Approach," Chapter 7, "Interconnection Networks," pp. 563–629 and Chapter 4, "Overcoming Data Hazards with Dynamic Scheduling," pp. 240–261, Second Edition, Morgan Kaufmann, San Francisco, CA, 1996.

Linley Gwennap et al., "Digital 21264 Sets New Standard," Microprocessor Report, vol. 10, No. 14, pp. 1–6, Oct. 1996.

A. Capitanio et al., "Architectural Tradeoff Analysis of Partitioned VLIW's," Department of Information and Computer Science at the University of California, Irvine, ICS–TR–94–14, pp. 1–29, Mar. 1994.

P.G. Lowney et al., "The Multiflow Trace Scheduling Compiler," The Journal of Supercomputing, vol. 7, pp. 51–142, 1993.

* cited by examiner

Primary Examiner—Eric Coleman
(74) Attorney, Agent, or Firm—Ryan, Mason & Lewis, LLP

(57) ABSTRACT

The invention provides techniques for reducing the port pressure of a clustered processor. In an illustrative embodiment, the processor includes multiple clusters of execution units, with each of the clusters having a portion of a register file and a portion of a predicate file associated therewith, such that a given cluster is permitted to write to and read from its associated portions of the register and predicate files. A cooperative interconnection technique in accordance with the invention utilizes an inter-cluster move instruction specifying a source cluster and a destination cluster to copy a value from the source cluster to the destination cluster. The value is transmitted over a designated interconnect structure within the processor, and the inter-cluster move instruction is separated into two sub-instructions, one of which is executed by a unit in the source cluster, and another of which is executed by a unit in the destination cluster. These units may be, e.g., augmented ALUs or dedicated interface units within the clusters.

22 Claims, 16 Drawing Sheets

FIG. 1

|  | BRANCH | STORE | LOAD | MEMORY | ALU |
|---|---|---|---|---|---|
| REGISTER READ | 3 | 3 | 2 | 3 | 2 |
| REGISTER WRITE | 0 | 0 | 1 | 1 | 1 |
| REGISTER TOTAL | 3 | 3 | 3 | 4 | 3 |
| REGISTER LOCK READ | 3 | 3 | 3 | 3 | 3 |
| REGISTER LOCK WRITE | 0 | 0 | 2 | 2 | 2 |
| REGISTER LOCK TOTAL | 3 | 3 | 5 | 5 | 5 |
| PREDICATE READ | 1 | 1 | 1 | 1 | 2 |
| PREDICATE WRITE | 0 | 0 | 0 | 0 | 1 |
| PREDICATE TOTAL | 1 | 1 | 1 | 1 | 3 |
| PREDICATE LOCK READ | 1 | 1 | 1 | 1 | 3 |
| PREDICATE LOCK WRITE | 0 | 0 | 0 | 0 | 2 |
| PREDICATE LOCK TOTAL | 1 | 1 | 1 | 1 | 5 |

FIG. 2

|  | O1 | O2 | GENERAL (MEMORY UNITS ONLY) | GENERAL (LOAD, STORE AND MEMORY UNITS) |
|---|---|---|---|---|
| REGISTER READ | 14 | 82 | $3(b+m)+2a$ | $3(b+s+m)+2(l+a)$ |
| REGISTER WRITE | 5 | 36 | $m+a$ | $l+m+a$ |
| REGISTER TOTAL | 19 | 118 | $3(b+a)+4m$ | $3(b+l+s+a)4m$ |
| REGISTER LOCK READ | 18 | 114 | $3(b+m+a)$ | $3(b+l+s+m+a)$ |
| REGISTER LOCK WRITE | 10 | 72 | $2(m+a)$ | $2(l+m+a)$ |
| REGISTER LOCK TOTAL | 28 | 186 | $3b+5(m+a)$ | $3(b+s)+5(l+m+a)$ |
| PREDICATE READ | 10 | 70 | $b+m+2a$ | $b+l+s+m+2a$ |
| PREDICATE WRITE | 4 | 32 | $a$ | $a$ |
| PREDICATE TOTAL | 14 | 102 | $b+m+3a$ | $b+l+s+m+3a$ |
| PREDICATE LOCK READ | 14 | 102 | $b+m+3a$ | $b+l+s+m+3a$ |
| PREDICATE LOCK WRITE | 8 | 64 | $2a$ | $2a$ |
| PREDICATE LOCK TOTAL | 22 | 166 | $b+m+5a$ | $b+l+s+m+5a$ |

FIG. 3

| | O1 | O2 | GENERAL (MEMORY UNITS ONLY) | GENERAL (LOAD, STORE AND MEMORY UNITS) |
|---|---|---|---|---|
| REGISTER READ | 14 | 26 | $3(b+m)+2e$ | $3(b+s+m)+2(l+e)$ |
| REGISTER WRITE | 5 | 36 | $m+ce$ | $l+m+ce$ |
| REGISTER TOTAL | 19 | 62 | $3b+4m+ce+2e$ | $3(b+l+s)+4m+ce+2e$ |
| REGISTER LOCK READ | 18 | 58 | $3(b+m)+ce+2e$ | $3(b+l+s+m)+ce+2e$ |
| REGISTER LOCK WRITE | 10 | 72 | $2(m+ce)$ | $2(l+m+ce)$ |
| REGISTER LOCK TOTAL | 28 | 130 | $3(b+ce)+5m+2e$ | $3(b+s+ce)+5(l+m)+2e$ |
| PREDICATE READ | 10 | 14 | $b+m+2e$ | $b+l+s+m+2e$ |
| PREDICATE WRITE | 4 | 32 | $ce$ | $ce$ |
| PREDICATE TOTAL | 14 | 46 | $b+m+2e+ce$ | $b+l+s+m+2e+ce$ |
| PREDICATE LOCK READ | 14 | 46 | $b+m+2e+ce$ | $b+l+s+m+2e+ce$ |
| PREDICATE LOCK WRITE | 8 | 64 | $2ce$ | $2ce$ |
| PREDICATE LOCK TOTAL | 22 | 110 | $b+m+2e+3ce$ | $b+l+s+m+2e+3ce$ |

FIG. 4

| | O1 | O2 | GENERAL (MEMORY UNITS ONLY) | GENERAL (LOAD, STORE AND MEMORY UNITS) |
|---|---|---|---|---|
| REGISTER READ | 14 | 82 | $3(b+m)+2ce$ | $3(b+s+m)+2(l+ce)$ |
| REGISTER WRITE | 5 | 8 | $m+e$ | $l+m+e$ |
| REGISTER TOTAL | 19 | 90 | $3b+4m+2ce+e$ | $3(b+l+s)+4m+2ce+e$ |
| REGISTER LOCK READ | 18 | 86 | $3(b+m)+2ce+e$ | $3(b+l+s+m)+2ce+e$ |
| REGISTER LOCK WRITE | 10 | 16 | $2(m+e)$ | $2(l+m+e)$ |
| REGISTER LOCK TOTAL | 28 | 102 | $3b+5m+2ce+3e$ | $3(b+s)+5(l+m)+2ce+3e$ |
| PREDICATE READ | 10 | 70 | $b+m+2ce$ | $b+s+l+m+2ce$ |
| PREDICATE WRITE | 4 | 4 | $e$ | $e$ |
| PREDICATE TOTAL | 14 | 74 | $b+m+2ce+e$ | $b+s+l+m+2ce+e$ |
| PREDICATE LOCK READ | 14 | 74 | $b+m+2ce+e$ | $b+s+l+m+2ce+e$ |
| PREDICATE LOCK WRITE | 8 | 8 | $2e$ | $2e$ |
| PREDICATE LOCK TOTAL | 22 | 82 | $b+m+2ce+3e$ | $b+s+l+m+2ce+3e$ |

FIG. 5

| | O1 | O2 | GENERAL (MEMORY UNITS ONLY) | GENERAL (LOAD, STORE AND MEMORY UNITS) |
|---|---|---|---|---|
| REGISTER READ | 14 | 26 | $3(b+m)+2e$ | $3(b+s+m)+2(l+e)$ |
| REGISTER WRITE | 5 | 36 | $m+ce$ | $l+m+ce$ |
| REGISTER TOTAL | 19 | 62 | $3b+4m+ce+2e$ | $3(b+l+s)+4m+ce+2e$ |
| REGISTER LOCK READ | 12 | 12 | $3e$ | $3e$ |
| REGISTER LOCK WRITE | 10 | 72 | $2(m+ce)$ | $2(l+m+ce)$ |
| REGISTER LOCK TOTAL | 22 | 84 | $3e+2(m+ce)$ | $3e+2(l+m+ce)$ |
| PREDICATE READ | 10 | 14 | $b+m+2e$ | $b+s+l+m+2e$ |
| PREDICATE WRITE | 4 | 32 | $ce$ | $ce$ |
| PREDICATE TOTAL | 14 | 46 | $b+m+2e+ce$ | $b+s+l+m+2e+ce$ |
| PREDICATE LOCK READ | 12 | 12 | $3e$ | $3e$ |
| PREDICATE LOCK WRITE | 8 | 64 | $2ce$ | $2ce$ |
| PREDICATE LOCK TOTAL | 20 | 76 | $3e+2ce$ | $3e+2ce$ |

FIG. 6

| | O1 | O2 | GENERAL (MEMORY UNITS ONLY) | GENERAL (LOAD, STORE AND MEMORY UNITS) |
|---|---|---|---|---|
| REGISTER READ | 8 | 15 | $2e+c-1$ | $2e+c-1$ |
| REGISTER WRITE | 5 | 8 | $m+e$ | $l+m+e$ |
| REGISTER TOTAL | 13 | 23 | $3e+m+c-1$ | $3e+l+m+c-1$ |
| REGISTER LOCK READ | 12 | 19 | $3e+c-1$ | $3e+c-1$ |
| REGISTER LOCK WRITE | 10 | 16 | $2(m+e)$ | $2(l+m+e)$ |
| REGISTER LOCK TOTAL | 22 | 35 | $5e+2m+c-1$ | $5e+2(l+m)+c-1$ |
| PREDICATE READ | 8 | 15 | $2e+c-1$ | $2e+c-1$ |
| PREDICATE WRITE | 4 | 4 | $e$ | $e$ |
| PREDICATE TOTAL | 12 | 19 | $3e+c-1$ | $3e+c-1$ |
| PREDICATE LOCK READ | 12 | 19 | $3e+c-1$ | $3e+c-1$ |
| PREDICATE LOCK WRITE | 8 | 8 | $2e$ | $2e$ |
| PREDICATE LOCK TOTAL | 20 | 27 | $5e+c-1$ | $5e+c-1$ |

FIG. 7

| | BRANCH | STORE | LOAD | MEMORY | ALU | DUPLICATOR |
|---|---|---|---|---|---|---|
| REGISTER READ | 3 | 3 | 2 | 3 | 2 | |
| REGISTER WRITE | 0 | 0 | 1 | 1 | 1 | 1 |
| REGISTER TOTAL | 3 | 3 | 3 | 4 | 3 | 1 |
| REGISTER LOCK READ | 3 | 3 | 3 | 3 | 3 | 1 |
| REGISTER LOCK WRITE | 0 | 0 | 2 | 2 | 2 | 2 |
| REGISTER LOCK TOTAL | 3 | 3 | 5 | 5 | 5 | 3 |
| PREDICATE READ | 1 | 1 | 1 | 1 | 2 | 1 |
| PREDICATE WRITE | 0 | 0 | 0 | 0 | 1 | 1 |
| PREDICATE TOTAL | 1 | 1 | 1 | 1 | 3 | 2 |
| PREDICATE LOCK READ | 1 | 1 | 1 | 1 | 3 | 2 |
| PREDICATE LOCK WRITE | 0 | 0 | 0 | 0 | 2 | 2 |
| PREDICATE LOCK TOTAL | 1 | 1 | 1 | 1 | 5 | 4 |

FIG. 8

| | O1 | O2 | GENERAL (MEMORY UNITS ONLY) | GENERAL (LOAD, STORE AND MEMORY UNITS) |
|---|---|---|---|---|
| REGISTER READ | 14 | 30 | $3(b+m)+2e+d$ | $3(b+s+m)+2(l+e)+d$ |
| REGISTER WRITE | 5 | 12 | $m+e+d$ | $l+m+e+d$ |
| REGISTER TOTAL | 19 | 38 | $3(b+e)+4m+d$ | $3(b+l+s+e)+4m+d$ |
| REGISTER LOCK READ | 18 | 38 | $3(b+m+e)+2d$ | $3(b+l+s+m+e)+d$ |
| REGISTER LOCK WRITE | 10 | 24 | $2(m+e+d)$ | $2(l+m+e+d)$ |
| REGISTER LOCK TOTAL | 28 | 62 | $5(m+e)+3b+4d$ | $5(l+m+e)+3(b+s)+3d$ |
| PREDICATE READ | 10 | 18 | $b+m+2e+d$ | $b+l+s+m+2e+d$ |
| PREDICATE WRITE | 4 | 8 | $e+d$ | $e+d$ |
| PREDICATE TOTAL | 14 | 26 | $b+m+3e+2d$ | $b+l+s+m+3e+2d$ |
| PREDICATE LOCK READ | 14 | 26 | $b+m+3e+2d$ | $b+l+s+m+3e+2d$ |
| PREDICATE LOCK WRITE | 8 | 16 | $2(e+d)$ | $2(e+d)$ |
| PREDICATE LOCK TOTAL | 22 | 42 | $b+m+5e+4d$ | $b+l+s+m+5e+4d$ |

FIG. 9

|  | ALU+ | ALU | INTERFACE |
|---|---|---|---|
| REGISTER READ | 3 | 2 | 3 |
| REGISTER WRITE | 1 | 1 | 1 |
| REGISTER TOTAL | 4 | 3 | 4 |
| REGISTER LOCK READ | 3 | 3 | 3 |
| REGISTER LOCK WRITE | 2 | 2 | 2 |
| REGISTER LOCK TOTAL | 5 | 5 | 5 |
| PREDICATE READ | 2 | 2 | 1 |
| PREDICATE WRITE | 1 | 1 | 1 |
| PREDICATE TOTAL | 3 | 3 | 2 |
| PREDICATE LOCK READ | 3 | 3 | 2 |
| PREDICATE LOCK WRITE | 2 | 2 | 2 |
| PREDICATE LOCK TOTAL | 5 | 5 | 4 |

FIG. 10

|  | O1 | O2 | GENERAL (LOAD, STORE AND MEMORY UNITS) |
|---|---|---|---|
| REGISTER READ | 15 | 15 | $3e$ |
| REGISTER WRITE | 5 | 5 | $e$ |
| REGISTER TOTAL | 20 | 20 | $4e$ |
| REGISTER LOCK READ | 15 | 15 | $3e$ |
| REGISTER LOCK WRITE | 10 | 10 | $2e$ |
| REGISTER LOCK TOTAL | 25 | 25 | $5e$ |
| PREDICATE READ | 10 | 10 | $2e$ |
| PREDICATE WRITE | 5 | 5 | $e$ |
| PREDICATE TOTAL | 15 | 15 | $3e$ |
| PREDICATE LOCK READ | 15 | 15 | $3e$ |
| PREDICATE LOCK WRITE | 10 | 10 | $2e$ |
| PREDICATE LOCK TOTAL | 25 | 25 | $5e$ |

FIG. 11

|  | 01 | 02 | GENERAL (LOAD, STORE AND MEMORY UNITS) |
|---|---|---|---|
| REGISTER READ | 12 | 12 | $2e+3i$ |
| REGISTER WRITE | 6 | 6 | $e+i$ |
| REGISTER TOTAL | 20 | 20 | $3e+4i$ |
| REGISTER LOCK READ | 18 | 18 | $3(e+i)$ |
| REGISTER LOCK WRITE | 12 | 12 | $2(e+i)$ |
| REGISTER LOCK TOTAL | 30 | 30 | $5(e+i)$ |
| PREDICATE READ | 10 | 10 | $2e+i$ |
| PREDICATE WRITE | 6 | 6 | $e+i$ |
| PREDICATE TOTAL | 16 | 16 | $3e+2i$ |
| PREDICATE LOCK READ | 16 | 16 | $3e+2i$ |
| PREDICATE LOCK WRITE | 12 | 12 | $2(e+i)$ |
| PREDICATE LOCK TOTAL | 28 | 28 | $5e+4i$ |

COOPERATIVE INTERCONNECTION FOR REDUCING PORT PRESSURE IN CLUSTERED MICROPROCESSORS

RELATED APPLICATIONS

The present application is related to U.S. Pat. application Ser. No. 09/274,129 entitled "Duplicator Interconnection Methods and Apparatus for Reducing Port Pressure in a Clustered Processor," and U.S. Pat. application Ser. No. 09/274,132 entitled "File Methods and Apparatus for Reducing Port Pressure in a Clustered Processor," both filed concurrently herewith in the name of inventors Dean Batten, Paul G. D'Arcy, C. John Glossner, Sanjay Jinturkar and Kent E. Wires.

FIELD OF THE INVENTION

The present invention relates generally to microprocessors and other types of digital data processors, and more particularly to processors which utilize a clustered organization, i.e., an organization in which groups of execution units are each associated with a designated portion of a register file.

BACKGROUND OF THE INVENTION

A significant problem with wide-issue load-store microprocessors is port pressure on the register file, i.e., the register file must support a large number of simultaneous accesses, and therefore the register file must have many ports. A fully-connected processor organization has execution units which each have full access to the entire register file. Predicate registers and lock files for both registers and predicates also require a correspondingly large number of ports. Since the number of ports can adversely impact the area, cost and maximum clock speed of the processor, it is generally desirable to keep the number of ports under some small number, such as 16 or 32. Execution units and register files may therefore be "clustered" in order to reduce the number of ports required for all simultaneously-utilized execution units.

A clustered organization, in contrast to a fully-connected organization, has groups, i.e., "clusters," of execution units, each with a portion of the register file. The portion of the register file associated with a given cluster may be referred to as "local" registers. The execution units in a given cluster have full access to the local registers, but limited access to the registers of other clusters. In a clustered organization, the degree of access one cluster has to the others' register files and the interconnection between clusters must be specified. The purpose of clustering is to reduce the register file port pressure. However, the need for some execution units to have global register file access keeps the typical cluster implementation from being truly scalable. In particular, load, store, and branch units, if shared between clusters, generally need global register file access. Register file ports can be shared among units requiring access to them. In this case, techniques for arbitrating among them, and for stalling a unit which is not allowed to use a port it has requested, generally must be provided.

Each type of execution unit in a processor needs a certain number of register file ports to support its operation. With the use of a technique such as virtual single cycle execution, as described in U.S. patent application Ser. No. 09/080,787 filed May 18, 1998 and entitled "Virtual Single-Cycle Execution in Pipelined Processors," it also requires a certain number of ports on a file of lock registers, a logically separate entity. With predicated execution based on architecturally separate predicate registers, a certain number of ports are also required on the predicate file and the predicate lock file.

FIG. 1 summarizes the port requirements for the following types of conventional execution units: branch units, store units, load units, memory units and arithmetic logic units (ALUs). The instructions associated with each of these types of execution units will be described below. Branch units process conditional branch instructions of the form $$[(p)] \text{ branch to } r_x \text{ if } r_y \circ r_z,$$

where register $r_x$ contains an instruction address, and registers $r_y$ and $r_z$ contain the values to be compared using the operator $\circ$ (representing operators such as =, <, >, etc.). The branch instruction requires reads of $r_x$, $r_y$ and $r_z$, reads of the locks on $r_x$, $r_y$ and $r_z$, and a read of predicate p and the lock on predicate p.

Store units process store instructions of the form $$[(p)] \text{ mem } [r_x + r_y] \leftarrow r_z.$$

The store instruction requires reads of $r_x$, $r_y$ and $r_z$, reads of the locks on $r_x$, $r_y$ and $r_z$, and a read of predicate p and the lock on predicate p. It is assumed for this example that predicate values are never individually stored in memory; for spilling and context switches, a block store instruction should be provided, which would not be executed in parallel with other instructions.

Load units process load instructions of the form $$[(p)] r_x \leftarrow \text{ mem } [r_y + r_z].$$

The load instruction requires reads of $r_y$ and $r_z$, and a write of $r_x$. It requires reads of the locks on $r_x$, $r_y$, and $r_z$, and two writes of the lock on $r_x$, i.e., once to lock it, and once to unlock it. It also requires the read of predicate p and the lock on predicate p. It is assumed for this example that predicate values are never individually loaded from memory; for filling and context switches, a block load instruction should be provided, which would not be executed in parallel with other instructions.

A memory unit can perform either a load or a store on each cycle. Therefore, it has the combined port requirements of a load and store unit. It may seem that the memory unit requires only three total register ports, since it cannot perform both a load and a store simultaneously. However, in a pipelined memory unit, a load followed by a number of stores will require four simultaneous register accesses during the load writeback. Conversely, a store followed by a load will use only two ports when the load is at register read. The average number of ports is three, but the peak is four.

Instructions processed by the ALU may be of the form $$[(p)] r_x \leftarrow r_y \circ r_z,$$

where operator $\circ$ represents &, +, etc., and predicate p, if provided, indicates whether the instruction's results should be written back or annulled. These instructions require reads of registers $r_y$ and $r_z$ and a write of register $r_x$. They require reads of the locks on $r_x$, $r_y$, and $r_z$, and two writes of the lock on $r_x$, i.e., one to lock the register at register read, and one to unlock the register at register writeback. Two write ports are required on the lock file for any unit which writes to a register. Even though the first write to the lock (at register read) and the second (at register writeback) are displaced in time, in order to be able to issue an instruction to the unit on every cycle, two write ports must be dedicated to it; if only one is given, the first write for a later instruction and the second write for an earlier instruction will contend for it.

The ALUs may also perform a predicate move instruction, having the form $$[(p_x)]p_y \leftarrow p_z.$$

To support this form of an ALU instruction, each ALU requires two predicate read ports, one predicate write port, three predicate lock read ports and two predicate lock write ports. Another form of ALU instruction sets or clears a predicate, based on a comparison between registers, and may have the following form $$[(p_x)] \text{ set } p_y \text{ if } r_y \circ r_z, \text{ or } [(p_x)] \text{ clear } p_y \text{ if } r_y \circ r_z,$$

where the operator $\circ$ represents =, <, etc. The number of ports already provided above will support this form of ALU instruction.

FIG. 2 shows the fully-connected port requirements for exemplary organizations O1 and O2, and a more general processor organization. Organization O1 has one branch unit, one memory unit, and four ALUs. O2 has two branch units, four memory units, and 32 ALUs. The general processor organization has b branch units, l load units, s store units, m memory units, and a ALUs. As noted previously, in a clustered organization, the register files and the set of execution units are partitioned into partially connected groups: each execution unit has full access to the register files in its local cluster, but limited access to the register files in any other cluster; the degree of access and the method of communication between clusters must be specified. A clustered organization with c clusters and e execution units in each cluster has a=ce total execution units in the clusters. An unclustered organization of the same size could be described either as having ce units in one cluster or as having c fully-connected clusters with e execution units in each. Using the latter definition, organizations O1 has four ALUs in a single cluster, and organization O2 has 32 ALUs arranged as four ALUs in each of eight clusters.

For these examples, it is assumed that branch, store, load, and memory units are global units, having access to all clusters' register files. In addition, the register files and predicate files can be treated separately. For example, an organization could have a unified, i.e., unclustered, predicate file and a clustered register file. It could even have both the predicate file and the register file clustered, but with different numbers of clusters. Lock files, on the other hand, are logically divided into the same number of clusters as the file they lock; a predicate file, with c clusters, for example, has a corresponding predicate lock file with c clusters. For simplicity of illustration, the examples will deal with register and predicate files partitioned into the same number of clusters.

FIGS. 3 and 4 show the port requirements for the O1, O2 and general examples described above, for write-only cluster interconnection and read-only cluster interconnection, respectively. The terms "write-only" and "read-only" in this context generally refer to whether or not register files and predicate files can be written or read. Whether or not locks must be written or read is a consequence of register and predicate writing and reading. Write-only clustered interconnection allows writing to remote clusters' register files, but does not allow reading from remote register files. Communication takes place by writing values into other clusters. Register locks as in the above-noted virtual single-cycle execution technique may be used to prevent overwriting registers which are in use. Any ALU may still set the value of a predicate in any cluster, but may not read remote predicates. The ports required by the ALUs (the only non-global execution units) change as a result of the write-only restriction for remote clusters. Register read ports are only required for local ALUs. The lock file port requirements change, since only one lock read port is required for remote ALUs. Likewise, predicate register and predicate lock port requirements change.

As shown in the FIG. 3, for the example organization O2, the write-only interconnection has reduced register file port requirements 47% (from 118 to 62), register lock file port requirements 30% (from 186 to 130), predicate file port requirements 55% (from 102 to 46), and predicate lock file port requirements 34% (from 166 to 110). These improvements have come at the expense of reduced connectivity, forcing the addition of move instructions in some circumstances.

The read-only clustered interconnection allows reading from remote clusters' register files, but does not allow writing. Communication takes place by writing results to the local cluster's register file, and reading from remote clusters' register files. With a read-only interconnection, register and predicate file write ports are only required for local ALUs, not remote ALUs. This also lowers the requirements for lock files. FIG. 4 summarizes the port requirements. Compared to the fully-connected version of example organization O2, the read-only interconnection version of O2 has reduced register port requirements 24% (from 118 to 90), register lock file port requirements 45% (from 186 to 102), predicate file port requirements 27% (from 102 to 74), and predicate lock file port requirements 51% (from 166 to 82). Again, these improvements come at the expense of reduced connectivity, forcing the addition of move instructions in some circumstances.

Although the above-described conventional write-only interconnection and read-only interconnection clustering techniques can provide a significant reduction in port pressure, further improvements are needed. A number of techniques have attempted to provide such improvements. For example, the Digital Equipment Corp. Alpha 21264 processor, as described in L. Gwennap, "Digital 21264 Sets New Standard," Microprocessor Report, Vol. 10, No. 14, Oct. 28, 1996, uses a form of register replication to reduce port pressure. However, this processor allows all execution units to use any register as a source or destination, replicates only registers, not predicates or locks, and accomplishes replication by writing results directly to both replicates of the register file. The number of ports required for replication in this technique is therefore a function of the total number of functional units, which limits scalability. Another known technique for reducing port pressure includes, e.g., multiflow machines using clusters interconnected by busses, as described in, e.g., P.G. Lowney et al., "The Multiflow Trace Scheduling Compiler," The Journal of Supercomputing, Vol. 7, pp. 51–142, 1993. Unfortunately, these and other techniques suffer from a number of significant drawbacks, and have been generally unable to provide further substantial reductions in register port pressure.

SUMMARY OF THE INVENTION

The invention provides techniques for reducing the port pressure of clustered microprocessors. In an illustrative embodiment, the processor includes multiple clusters of execution units, with each of the clusters having a portion of a processor register file and a portion of a processor predicate file associated therewith, such that a given cluster is permitted to write to and read from its associated portions of the register and predicate files. Techniques for reducing port pressure in accordance with the invention include a file replication technique, a duplicator interconnection technique, and a cooperative interconnection technique.

A file replication technique in accordance with the invention reduces port pressure by replicating a register lock file and a predicate lock file of the processor for each of the clusters. For example, in an embodiment in which clusters are arranged in a write-only interconnection, such that a given one of the clusters is also permitted to write to the portions of the register and predicate files associated with the other clusters, port pressure may be reduced by replicating both the register lock file and the predicate lock file of the processor for each of the clusters. As another example, the clusters may be arranged in a read-only interconnection, such that a given one of the clusters is also permitted to read from the portions of the register and predicate files associated with the other clusters. Port pressure is reduced in this case by replicating both the register lock file and the predicate lock file of the processor for each of the clusters, while also replicating the register file and the predicate file. A given one of the clusters maintains master values for the portions of the register file and the predicate file associated therewith, and propagates the master values to the other clusters. Advantageously, the number of ports required using the file replication of the invention is a function of the number of replicates, rather than a function of the total number of functional units as in the above-described conventional file replication technique.

A duplicator interconnection technique in accordance with the invention reduces port pressure by providing one or more global move units in the processor. A given global move unit uses an inter-cluster move instruction to copy a value from a portion of the register or predicate file associated with of the clusters, i.e., a source cluster, to another portion of the file associated with another one of the clusters, i.e., a destination cluster. The inter-cluster move instruction may, e.g., move a general-purpose register value from a portion of the register file associated with the source cluster to a portion of the register file associated with the destination cluster, or a predicate value from a portion of the predicate file associated with the source cluster to a portion of the predicate file associated with the destination cluster. The global move unit in the illustrative embodiment has access to all of the clusters' register and predicate files. This technique reduces port pressure by eliminating ALU access to remote clusters, and instead providing an architectural inter-cluster move instruction which has access to more than one cluster.

A cooperative interconnection technique in accordance with the invention reduces port pressure utilizing substantially the same architectural restriction as the duplicator interconnection technique, i.e., that no arithmetic instruction may have operands in remote clusters. Values which are produced in one cluster and required in another are thus moved by an inter-cluster move instruction. However, the value is transmitted over a designated interconnect structure within the processor, and the inter-cluster move instruction is effectively separated into two sub-instructions, one of which is executed by a unit in the source cluster, and another of which is executed by a unit in the destination cluster. These units may be, e.g., augmented ALUs or dedicated interface units within the clusters. This cooperative interconnection technique reduces port pressure using the same architectural inter-cluster move instruction as duplicator interconnection, but a different implementation, i.e., an interconnection structure allowing units without global access to cooperate in order to execute inter-cluster move instructions.

Advantageously, the invention can provide substantial reductions in port pressure relative to conventional fully-connected and clustered organizations. These improvements generally come at the expense of, e.g., reduced connectivity, enlarged or additional functional units or structures, or additional explicit inter-cluster move instructions. The invention is particularly well suited for use in microprocessors, but could be utilized in any type of clustered digital data processor. These and other features and advantages of the present invention will become more apparent from the accompanying drawings and the following detailed description.

BRIEF DESCRIPTION OF THE DRAWINGS

FIG. 1 summarizes the port requirements for the following types of conventional execution units: branch units, store units, load units, memory units and arithmetic logic units (ALUs).

FIG. 2 shows the port requirements for a conventional fully-connected processor organization.

FIGS. 3 and 4 show the port requirements for conventional write-only and read-only cluster interconnections, respectively.

FIG. 5 shows the port requirements for write-only cluster interconnection with replicated lock files in accordance with the invention.

FIG. 6 shows the port requirements for read-only cluster interconnection with all files replicated in accordance with the invention.

FIG. 7 shows the port requirements for the conventional execution units as shown in FIG. 1 and for a duplicator in accordance with the invention.

FIG. 8 shows the port requirements for cluster interconnection by duplicator units in accordance with the invention.

FIG. 9 shows the port requirements for execution units used with cooperative interconnections in accordance with the invention.

FIG. 10 shows the port requirements for cooperative interconnection with augmented ALUs in accordance with the invention.

FIG. 11 shows the port requirements for cooperative interconnection with interface units in accordance with the invention.

DETAILED DESCRIPTION OF THE INVENTION

Figure 12:
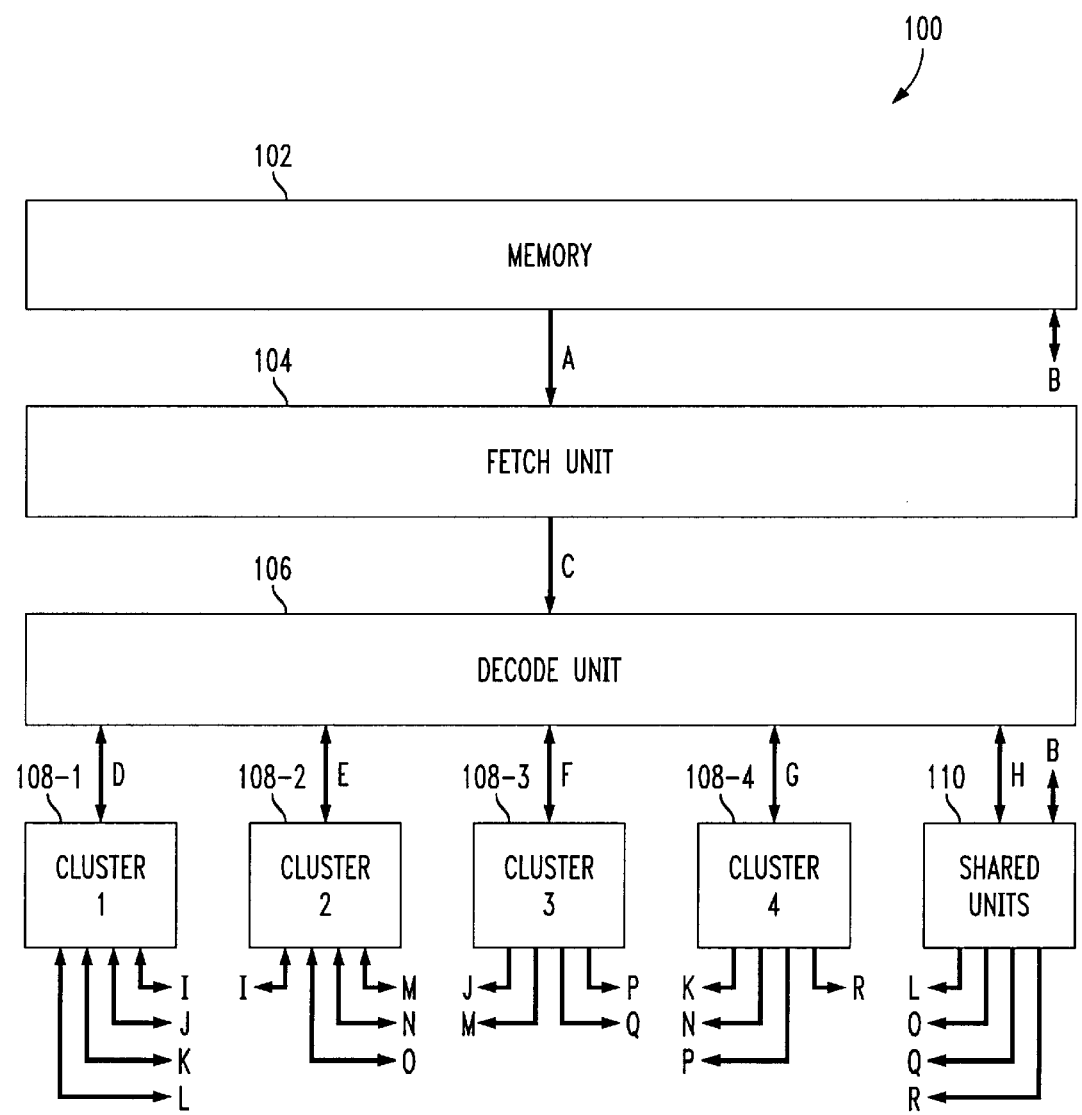
FIG. 12 shows an illustrative embodiment of a processor in accordance with the invention.

The invention will be illustrated below in conjunction with exemplary processors and processing systems. It should be understood, however, that the invention is more generally applicable to any clustered processor or processing system in which it is desirable to reduce port pressure. The term "processor" as used herein is intended to include any device in which instructions retrieved from a memory or other storage element are executed using one or more execution units. Exemplary processors in accordance with the invention may therefore include, for example, microprocessors, central processing units (CPUs), very long instruction word (VLIW) processors, single-issue processors, multi-issue processors, digital signal processors, application-specific integrated circuits (ASICs), personal computers, mainframe computers, network computers, workstations and servers, and other types of data processing devices, as well as portions and combinations of these and other devices.

File Replication

A first aspect of the invention is directed to a file replication technique which reduces port pressure in a clustered microprocessor. By replicating register or lock files, the required ports can be distributed across the multiple copies, thereby reducing the number of ports associated with any particular copy. This file replication technique will be illustrated herein for write-only cluster interconnection and read-only cluster interconnection.

In accordance with the invention, the lock file port requirements in a write-only cluster interconnection are further reduced by replicating the lock file to each cluster. Although the write port requirements will not be reduced, since each change will need to be written to all copies of the lock file, each cluster will now be able to read its own copy of the lock file, thereby reducing the read port requirements. This aspect of the invention can be applied to both register lock files and predicate lock files, i.e., either the register lock file, the predicate lock file, or both, can be replicated to each cluster.

In a write-only replicated embodiment of the invention, all clustered ALUs will read from the local file replicates. A given cluster will contain replicates of both local and remote files; the local replicate is essentially the original. Since the access of ALUs to remote files is restricted, i.e., write-only access to remote register files, the number of ports required for the remote file replicates is smaller than the number of ports required for the local replicate. The ports required to support global units may be divided among the various remote replicates in the various clusters. In this way, the worst case port requirement is for the local replicate in each cluster. If necessary, it can be ensured that this is the case by using more replicates, e.g., by giving the global units their own replicates.

FIG. 5 shows the port requirements for the write-only interconnection with replicated register and predicate lock files in accordance with the invention. In example organization O2, the register lock file port requirements are reduced 35% from the conventional write-only interconnection of FIG. 3 (from 130 to 84) which is 55% from the fully-connected organization of FIG. 2 (from 186 to 84), and predicate lock file port requirements are reduced 31% from the conventional write-only interconnection of FIG. 3 (from 110 to 76), which is 54% from the fully-connected organization of FIG. 2 (from 166 to 76). These additional improvements provided by the invention come at the additional expense of the area required for the replicated lock files.

As with the write-only interconnection, the conventional read-only interconnection results can be further improved in accordance with the invention by replicating the lock files, so that each cluster reads from its own copy of a given lock file. For lock files, this strategy will generally be more effective for the read-only interconnection than for the write-only interconnection. This is because in the write-only interconnection, all ALUs still need to be able to read and write the lock files in remote clusters, but in the read-only interconnection, ALUs need not write to remote lock files. Again, as in the previously-described write-only interconnection, both the register lock files and the predicate lock files may be replicated. Furthermore, in the read-only interconnection, register and predicate files may also be replicated. Since in the read-only interconnection, only the cluster which "owns" a register may change it, coherency between the copies may be maintained by replicating a master to a set of slaves, where each cluster keeps the master for the registers it owns. In order to propagate the master's value to the slaves, one read port is added to the master for every slave. Thus the master has the worst case port requirements. As for read port requirements for global units, they can be divided among the replicates, as in the write-only interconnection previously described.

FIG. 6 shows the resulting port requirements for replicating all files, i.e., register files, predicate files, register lock files and predicate lock files, with a read-only interconnection. Compared to the conventional read-only interconnection version of example O2, as shown in FIG. 3, replication of files in accordance with the invention has reduced register file port requirements 74% (from 90 to 23), register lock file port requirements 66% (from 102 to 35), predicate file port requirements 74% (from 74 to 19), and predicate lock file port requirements 67% (from 82 to 27). Compared to the fully-connected version of example O2, as shown in FIG. 2, the replicated read-only version has reduced register file port requirements 81% (from 118 to 23), register lock file port requirements 81% (from 186to 35), predicate file port requirements 81% (from 102 to 19), and predicate lock file port requirements 84% (from 166to 27). These additional improvements provided by the invention come at the additional expense of the area required for replicated register, predicate, and lock files.

Duplicator Interconnection

A second aspect of the invention provides a duplicator interconnection technique which reduces port pressure in a clustered microprocessor by restricting ALUs from any direct access to remote register files, instead providing global move units which copy values from one cluster's register file to another. All values generated in one cluster and used in another are moved by an explicit instruction, using one or more of the global move units. The global move units are referred to herein as "duplicators," and the letter d is used to denote the number of such units provided in an organization.

A move instruction generally has two forms, one moving a general-purpose register value, and the other moving a predicate value:

$$[(p)]r_x \leftarrow r_y \text{ or } [(p_x)]p_y \leftarrow p_z.$$

If a move is within a cluster, any ALU can perform the move. If the move is between clusters, a duplicator performs it. For moves between clusters, the first form of the move instruction requires read of register $r_y$, write of register $r_x$, and read of predicate p; it also requires reads of the locks on $r_x$, $r_y$, and p and two writes of the lock on $r_x$. Note that the register accesses are split between the source and destination clusters: the read of $r_y$ is in the source cluster, but the write of $r_x$ is in the destination cluster, for a total of one access per cluster. Similarly, the read of lock on $r_y$ is in the source cluster, while the other lock reads and writes are in the destination cluster; the worse case, then, is the destination cluster, which requires one lock read, and two lock writes.

The second form of the move instruction requires reads of predicates $p_x$ and $p_z$, write of $p_y$, reads of locks on $p_x$, $p_y$ and $p_z$, and two writes of the lock on $p_y$. Whether the instruction predicate $p_x$ is taken from the source or destination cluster changes the port requirements: we will assume that the predicate is taken from the destination cluster. Like the first case, the accesses are split between the source and destination clusters: the read of $p_z$ is in the source cluster, while the read of $p_x$ and write of $p_y$ are in the destination cluster. Likewise, the read of lock on $p_z$ is in the source cluster, while the reads and writes of the locks on $p_x$ and $p_y$ are in the destination cluster. The worse case is the destination cluster. FIG. 7 shows the number of ports required to support the above-described duplicators. The branch, store, load, memory and ALU information from FIG. 1 is repeated in FIG. 7 for purposes of comparison.

FIG. 8 shows the port requirements for the O1, O2 and general example organizations using duplicator interconnection in accordance with the invention. In the O2 example, it is assumed that four duplicators are used to perform global move operations. Compared to the fully-connected version of example O2, as shown in FIG. 2, the interconnection by duplicator units has reduced register file port requirements 68% (from 118 to 38), register lock file port requirements 67% (from 186 to 62), predicate file port requirements 75% (from 102 to 26), and predicate lock file port requirements 75% (from 166 to 42). These improvements come at the expense of reduced connectivity and the addition of new global duplicator units, as well as the need for additional move instructions in some circumstances.

Cooperative Interconnection

A third aspect of the invention provides a cooperative interconnection technique which reduces port pressure in a clustered microprocessor by requiring two execution units to be involved in executing an inter-cluster move instruction: one in the source cluster and one in the destination cluster. The source unit sends the value, and the destination unit receives it. The cooperative move can be carried out by augmented ALUs or by dedicated interface units placed in each cluster. The number of ports required is reduced by the use of cooperative moves: for example, the above-described duplicators require their own ports, while a cooperative move uses the ports already dedicated to the source and destination units.

The cooperative move in accordance with the invention may be implemented in an architecturally invisible manner; the architecture simply defines the move instruction. Implied by the idea of a cooperative move is the existence of some structure on which the value can be transmitted. Any suitable structure may be used, and the structure may be architecturally invisible. Examples of such structures include a crossbar switch, a simpler switch, or a set of busses. The structure, regardless of its particular implementation, provides a certain number of connections, so that $r_x \leftarrow r_y$ becomes $r_x \leftarrow Connection_n$, $Connection_n \leftarrow r_y$. In other words, a single instruction $r_x \leftarrow r_y$ is split by the decoder into two sub-instructions which are issued and executed at the same time, $r_x \leftarrow Connection_n$ by a unit in the destination cluster, and $Connection_n \leftarrow r_y$ by a unit in the source cluster. This technique can also be applied to branch, load, store, and memory units. Rather than dedicate ports to global units, these units read values from and write values to the interconnect structure, relying on the cooperating units to move values from and to the appropriate registers.

The cooperative interconnection technique may be implemented using augmented ALUs as cooperating units. Such an augmented ALU is referred to herein as an ALU+. Since ALUs are only able to read two values, but branch and store units require three, the ALU+ should have three read ports. FIG. 9 shows the port requirements associated with an exemplary ALU+ in accordance with the invention.

FIG. 10 shows the port requirements if all global units, i.e., move, branch, load, store and memory units, are converted to use the above-described cooperative interconnection technique. The example organizations have been modified, since the ALU+s will now be used for other instructions as well: one ALU+ is added to each cluster of each example organization, such that e=5 for both organizations O1 and O2. Compared to the original fully-connected version of example O2, as shown in FIG. 2, cooperative interconnection using ALU+ units reduces register file port requirements 83% (from 118 to 20), register lock file port requirements 87% (from 186 to 25), predicate file port requirements 85% (from 102 to 15), and predicate lock file port requirements 85% (from 166 to 25). These improvements come at the expense of reduced connectivity, requiring additional move instructions in some circumstances; use of two cooperating execution units to accomplish operations which are not local to a cluster; augmenting ALUs to perform cooperation; providing new interconnection structures; and augmenting the decoder to coordinate the cooperative move.

As an alternative to the above-described use of augmented ALUs as cooperating units, dedicated interface units may be provided in each cluster. This approach may not conserve ports as well as the ALU+ approach, but still provides a port advantage over other approaches, because global moves, branches, loads and stores use the ports of an interface unit. FIG. 11 summarizes the port requirements when using interface units to provide cooperative interconnection in accordance with the invention. Since all global units now require use of an interface unit, two interface units are added for each cluster of each example organization. The letter i is used to denote the number of interface units per cluster. The number of ALUs for both O1 and O2 is four, i.e., e=4.

Cooperative interconnection using interface units, in example organization O2, has reduced register file port requirements 83% (from 118 to 20), register lock file port requirements 84% (from 186 to 30), predicate file port requirements 84% (from 102 to 16), and predicate lock file port requirements 83% (from 166 to 28), compared with the fully-connected organization of FIG. 2. These improvements come at the expense of: reduced connectivity; requiring additional move instructions in some circumstances; use of two cooperating execution units to accomplish operations which are not local to a cluster; providing completely new interface units in each cluster; providing new interconnection structures; and augmenting the decoder to coordinate the cooperative move.

Additional Examples

Figure 13:
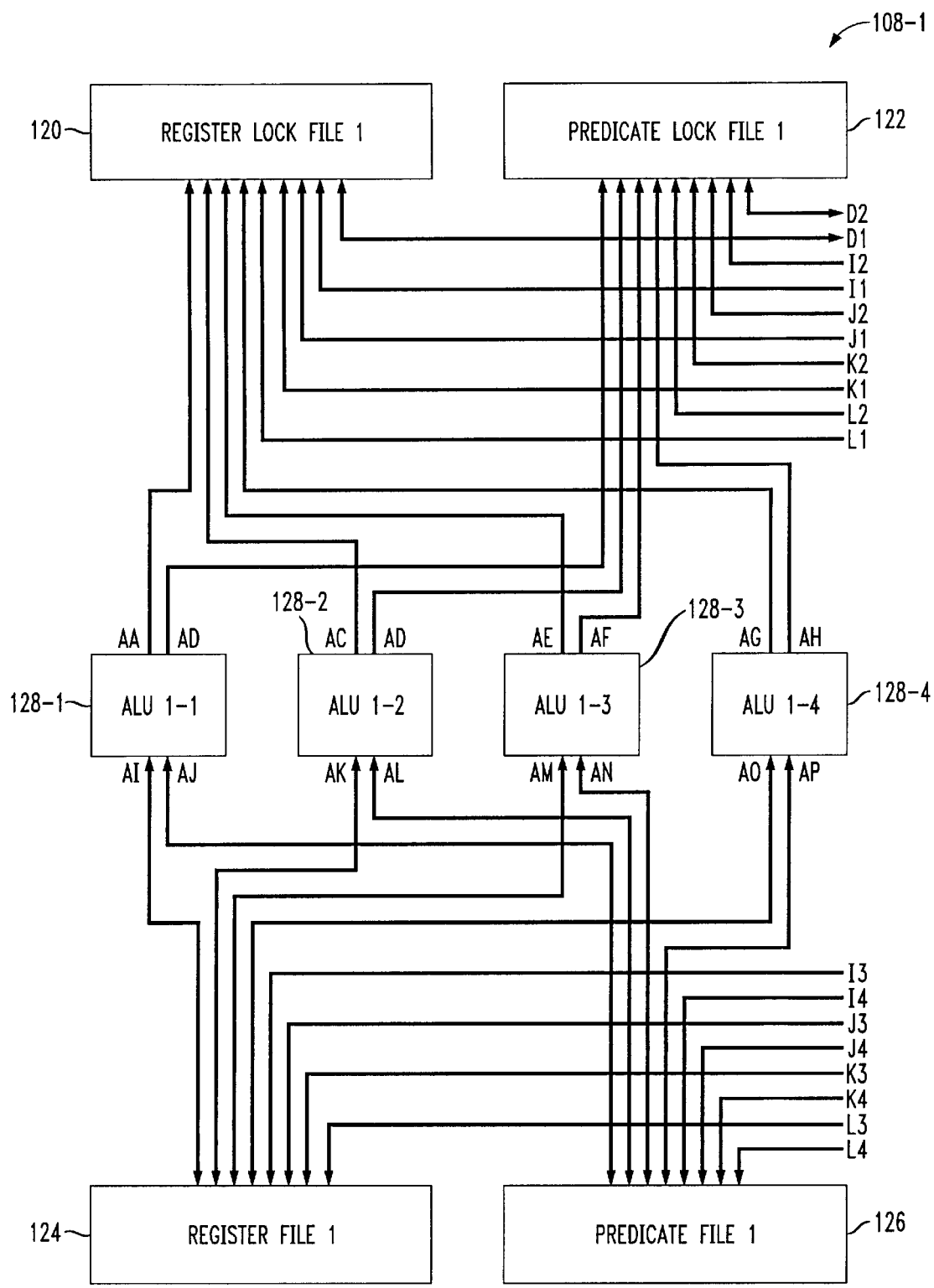
FIG. 13 shows one of the clusters of the FIG. 12 processor in greater detail for write-only replicated, read-only replicated and duplicator interconnection embodiments of the invention. For clarity, file replicates are not shown.

Additional examples of the above-described embodiments of the invention will be given below with reference to FIGS. 12 through 17. FIG. 12 shows a processor 100 in accordance with the invention. The processor 100 includes a memory 102, a fetch unit 104, a decode unit 106, a set of four clusters 108-1, 108-2, 108-3 and 108-4, and a set of shared units 110. The shared units 110 are also referred to herein as global units. It is assumed that the processor 100 includes a total of 16 ALUs, with each of the clusters 108-1, 108-2, 108-3 and 108-4 including four of the 16 ALUs. FIG. 13 shows one of the clusters 108-1 in greater detail for write-only replicated, read-only replicated and duplicator interconnection embodiments of the invention. The cluster 108-1 includes a register lock file 120, a predicate lock file 122, a register file 124 and a predicate file 126. The cluster 108-1 also includes four ALUs 128-1, 128-2, 128-3 and 128-4, arranged as shown.

It should be noted that, for simplicity and clarity of illustration, FIG. 13 shows neither the replicates nor connections to the replicates or to other clusters. Only connections which affect cluster 108-1 port requirements are shown. In addition, connections and port requirements are described in detail below for cluster 108-1, with the understanding that the connections and port requirements for this cluster are typical of those for the other clusters in the processor. The register lock file, predicate lock file, register file and predicate file shown in cluster 108-1 in FIGS. 13, 16 and 17 herein should be understood to represent portions of one or more larger processor storage elements, e.g., larger register lock files, predicate lock files, register files and predicate files. Other clusters will similarly be associated with other portions of such storage elements. These storage elements may be viewed as parts of other memory elements of the processor 100, such as parts of memory 102 of FIG. 12.

Figure 14:
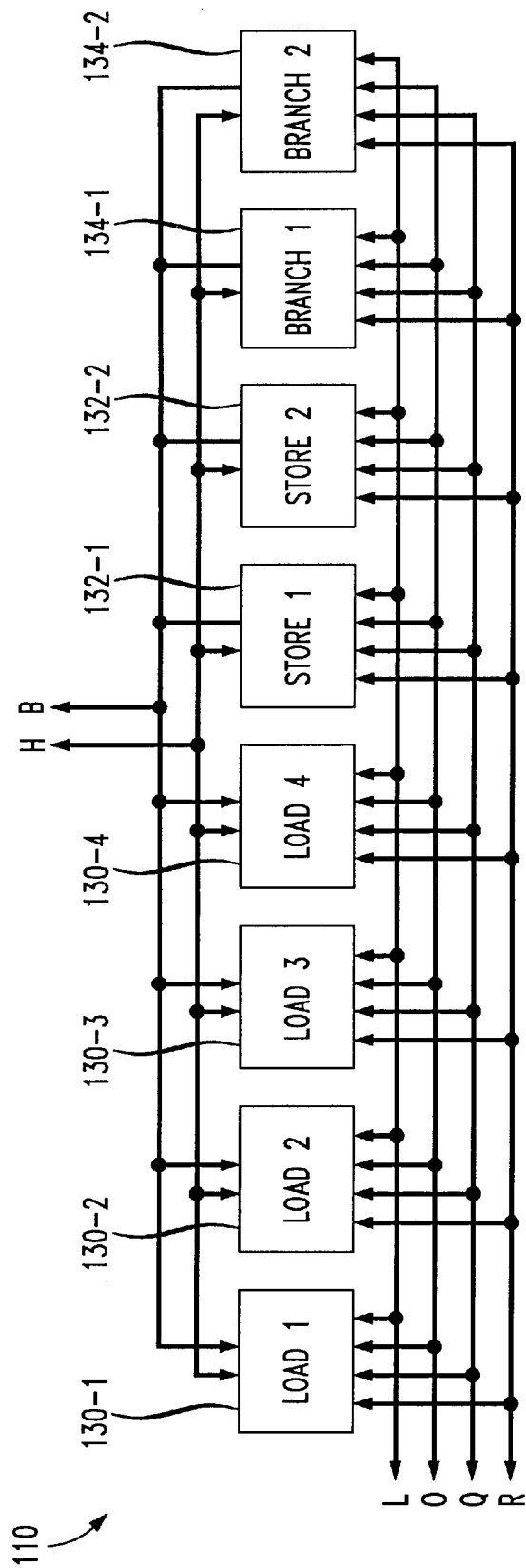
FIG. 14 shows the global units of the FIG. 12 processor for write-only replicated, read-only replicated and cooperative interconnection embodiments of the invention.
Figure 15:
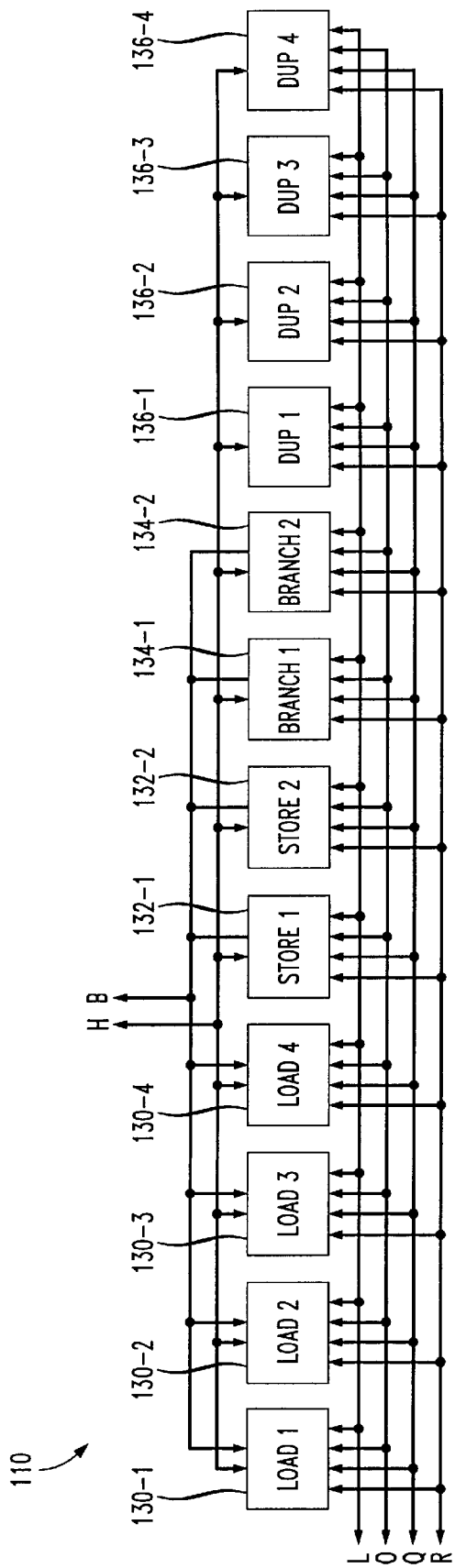
FIG. 15 shows the global units of the FIG. 12 processor for a duplicator interconnection embodiment of the invention.

FIG. 14 shows the global units 110 for write-only replicated, read-only replicated and cooperative interconnection embodiments of the invention. The global units 110 in FIG. 14 include four load units 130-1, 130-2, 130-3 and 130-4, two store units 132-1 and 132-2, and 134-1 and 134-2. FIG. 15 shows the global units for a duplicator interconnection embodiment of the invention. The organization using duplicator units includes the global units of FIG. 14 with the addition of four duplicator units 136-1, 136-2, 136-3 and 136-4.

The write-only, read-only, and duplicator interconnections in the present example vary port count by changing the interconnection between clusters, rather than the internal cluster organization of any particular cluster. TABLE 1 below summarizes the invariant requirements for this example.

In the following description, letter designations for connections correspond generally to the letter designations shown for connections as illustrated in FIGS. 12 through 17. Sub-parts of a given letter-designated connection may be indicated in the following description by additional numerals and/or lower-case letters where appropriate, although such sub-parts in some cases may not be specifically shown in FIGS. 12 through 17.

The connections external to the cluster 108-1 that do not change with type of organization include:

A. Instruction path from memory 102 to fetch unit 104.

B. Data path from memory 102 to load and store units (in shared units 110).

C. Instruction path from fetch unit 104 to decode unit 106.

D. Instruction path from decode unit 106 to cluster 108-1.

D1a. 12 register lock read ports in cluster 108-1 to decode unit 106 due to instructions destined for cluster 108-1.

D1b. 4 register lock write ports in cluster 108-1 to decode unit 106 due to instructions destined for cluster 108-1.

D2a. 12 predicate lock read ports in cluster 108-1 to decode unit 106 due to instructions destined for cluster 108-1.

D2b. 4 predicate lock write ports in clusterb 108-1 to decode unit 106 due to instructions destined for cluster 108-1.

H. Instruction path from decode unit 106 to shared units 110.

Connections internal to the cluster 108-1 that do not change with type of organization include:

AA. 1 register lock write port

AB. 1 predicate lock write port

AC. 1 register lock write port

AD. 1 predicate lock write port

AE. 1 register lock write port

AF. 1 predicate lock write port

AG. 1 register lock write port

AH. 1 predicate lock write port

AIa. 2 register read ports (3 for ALU+)

AIb. 1 register write port

AJa. 2 predicate read ports

AJb. 1 predicate write port

AKa. 2 register read ports (3 for ALU+)

AKb. 1 register write port

ALa. 2 predicate read ports

ALb. 1 predicate write port

AMa. 2 register read ports (3 for ALU+)

AMb. 1 register write port

ANa. 2 predicate read ports

ANb. 1 predicate write port

AOa. 2 register read ports (3 for ALU+)

AOb. 1 register write port

APa. 2 predicate read ports

APb. 1 predicate write port

TABLE 1

Summary of Invariant Port Requirements in Cluster 108-1 or FIG. 13.

|  | Read | Write | Total |
| --- | --- | --- | --- |
| Register lock | 12 | 8 | 20 |
| Predicate lock | 12 | 8 | 20 |
| Register | 8 | 4 | 12 |
| Predicate | 8 | 4 | 12 |

Connections between clusters in the FIG. 13 example that vary with the type of organization include, for the typical cluster 108-1, the following:

D1c. Register lock read ports in cluster 108-1 to decode unit 106 due to instructions destined for other clusters.

D1d. Register lock write ports in cluster 108-1 to decode unit 106 due to instructions destined for other clusters.

D1e. Register lock read ports in cluster 108-1 to decode unit 106 due to instructions destined for global units.

D1f. Register lock write ports in cluster 108-1 to decode unit 106 due to instructions destined for global units.

D2c. Predicate lock read ports in cluster 108-1 to decode unit 106 due to instructions destined for other clusters.

D2d. Predicate lock write ports in cluster 108-1 to decode unit 106 due to instructions destined for other clusters.

D2e. Predicate lock read ports in cluster 108-1 to decode unit 106 due to instructions destined for global units.

D2f. Predicate lock write ports in cluster 108-1 to decode unit 106 due to instructions destined for global units.

I1a. Register lock read ports in cluster 108-1 to cluster 108-2.

I1b. Register lock write ports in cluster 108-1 to cluster 108-2.

I2a. Predicate lock read ports in cluster 108-1 to cluster 108-2.

I2b. Predicate lock write ports in cluster 108-1 to cluster 108-2.

I3a. Register read ports in cluster 108-1 to cluster 108-2.

I3b. Register write ports in cluster 108-1 to cluster 108-2.

I4a. Predicate read ports in cluster 108-1 to cluster 108-2.

I4b. Predicate write ports in cluster 108-1 to cluster 108-2.

J1a. Register lock read ports in cluster 108-1 to cluster 108-3.

J1b. Register lock write ports in cluster 108-1 to cluster 108-3.

J2a. Predicate lock read ports in cluster 108-1 to cluster 108-3.

J2b. Predicate lock write ports in cluster 108-1 to cluster 108-3.

J3a. Register read ports in cluster 108-1 to cluster 108-3.

J3b. Register write ports in cluster 108-1 to cluster 108-3.

J4a. Predicate read ports in cluster 108-1 to cluster 108-3.

J4b. Predicate write ports in cluster 108-1 to cluster 108-3.

K1a. Register lock read ports in cluster 108-1 to cluster 108-4.

K1b. Register lock write ports in cluster 108-1 to cluster 108-4.

K2a. Predicate lock read ports in cluster 108-1 to cluster 108-4.

K2b. Predicate lock write ports in cluster 108-1 to cluster 108-4.

K3a. Register read ports in cluster 108-1 to cluster 108-4.

K3b. Register write ports in cluster 108-1 to cluster 108-4.

K4a. Predicate read ports in cluster 108-1 to cluster 108-4.

K4b. Predicate write ports in cluster 108-1 to cluster 108-4.

L1. Register lock write ports in cluster 108-1 to shared units 110.

L2. Predicate lock write ports in cluster 108-1 to shared units 110.

L3a. Register read ports in cluster 108-1 to shared units 110.

L3b. Register write ports in cluster 108-1 to shared units 110.

L4a. Predicate read ports in cluster 108-1 to shared units 110.

L4b. Predicate write ports in cluster 108-1 to shared units 110.

TABLES 2 through 5 below summarize the varying port requirements listed above for fully-connected, write-only replicated, write-only, read-only replicated, read-only and duplicator interconnection organizations.

TABLE 2

Register Lock Port Requirements

| | Fully Connected | Write-only | Write-only Replicated | Read-only | Read-only Replicated | Duplicator |
|---|---|---|---|---|---|---|
| Register Lock Read | | | | | | |
| D1c | 36 | 12 | 0* | 24 | 0* | 0 |
| D1e | 24 | 24 | 0* | 24 | 0* | 28 |
| I1a | 0 | 0 | 0 | 0 | 1*** | 0 |
| J1a | 0 | 0 | 0 | 0 | 1*** | 0 |
| K1a | 0 | 0 | 0 | 0 | 1*** | 0 |
| Register Lock Write | | | | | | |
| D1d | 12 | 12 | 12 | 0 | 0 | 0 |
| D1f | 4 | 4 | 4 | 4 | 4 | 8 |
| I1b | 4 | 4 | 4 | 0 | 0 | 0 |
| J1b | 4 | 4 | 4 | 0 | 0 | 0 |
| K1b | 4 | 4 | 4 | 0 | 0 | 0 |
| L1 | 4 | 4 | 4 | 4 | 4 | 8 |
| Register Lock Total | | | | | | |
| | 92 | 68 | 32 | 56 | 11 | 44 |

TABLE 3

Predicate Lock Port Requirements

| | Fully Connected | Write-only | Write-only Replicated | Read-only | Read-only Replicated | Duplicator |
|---|---|---|---|---|---|---|
| Predicate Lock Read | | | | | | |
| D2c | 36 | 12 | 0* | 24 | 0* | 0 |
| D2e | 8 | 8 | 0* | 8 | 0* | 16 |

TABLE 3-continued

Predicate Lock Port Requirements

|  | Fully Connected | Write-only | Write-only Replicated | Read-only | Read-only Replicated | Duplicator |
|---|---|---|---|---|---|---|
| I2a | 0 | 0 | 0 | 0 | 1*** | 0 |
| J2a | 0 | 0 | 0 | 0 | 1*** | 0 |
| K2a | 0 | 0 | 0 | 0 | 1*** | 0 |
| Predicate Lock Write | | | | | | |
| D2d | 12 | 12 | 12 | 0 | 0 | 0 |
| D2f | 0 | 0 | 0 | 0 | 0 | 4 |
| I2b | 4 | 4 | 4 | 0 | 0 | 0 |
| J2b | 4 | 4 | 4 | 0 | 0 | 0 |
| K2b | 4 | 4 | 4 | 0 | 0 | 0 |
| L2 | 0 | 0 | 0 | 0 | 0 | 8 |
| Predicate Lock Total | | | | | | |
|  | 68 | 44 | 24 | 32 | 3 | 24 |

TABLE 4

Register Port Requirements

|  | Fully Connected | Write-only | Write-only Replicated | Read-only | Read-only Replicated | Duplicator |
|---|---|---|---|---|---|---|
| Register Read | | | | | | |
| I3a | 8 | 0 | 0 | 8 | 0* | 0 |
| J3a | 8 | 0 | 0 | 8 | 1*,*** | 0 |
| K3a | 8 | 0 | 0 | 8 | 1*,*** | 0 |
| L3a | 20 | 20 | 20 | 20 | 1*,*** | 24** |
| Register Write | | | | | | |
| I3b | 4 | 4 | 4 | 0 | 0 | 0 |
| J3b | 4 | 4 | 4 | 0 | 0 | 0 |
| K3b | 4 | 4 | 4 | 0 | 0 | 0 |
| L3b | 4 | 4 | 4 | 4 | 4 | 8** |
| Register Total | | | | | | |
|  | 60 | 36 | 36 | 48 | 7 | 28** |

TABLE 5

Predicate Port Requirements

|  | Fully Connected | Write-only | Write-only Replicated | Read-only | Read-only Replicated | Duplicator |
|---|---|---|---|---|---|---|
| Predicate Read | | | | | | |
| I4a | 8 | 0 | 0 | 8 | 0* | 0 |
| J4a | 8 | 0 | 0 | 8 | 1*,*** | 0 |
| K4a | 8 | 0 | 0 | 8 | 1*,*** | 0 |
| L4a | 8 | 8 | 8 | 8 | 1*,*** | 12 |
| Predicate Write | | | | | | |
| I4b | 4 | 4 | 4 | 0 | 0 | 0 |
| J4b | 4 | 4 | 4 | 0 | 0 | 0 |
| K4b | 4 | 4 | 4 | 0 | 0 | 0 |
| L4b | 4 | 0 | 0 | 0 | 0 | 4 |
| Predicate Total | | | | | | |
|  | 44 | 20 | 20 | 32 | 3 | 16 |

In the foregoing tables, the * notation indicates a case in which files are replicated with one replicate of each cluster's files in each cluster, such that there are now four cases for each file, one for each replicate. For example, when counting the number of lock read ports in cluster 108-1, the number in replicates 1, 2, 3, and 4 must be considered. Reads by clusters are on the local replicate, and the reads required by global units are added to the replicates with the least read ports otherwise required. The result is that the replicate handling the local reads is the worst case, with no ports on this replicate given to global units. If necessary, one can ensure that this is the case by adding replicates; in the above example, one could add a fifth replicate to be located with the global units. The  notation indicates that L1a and L1b include ports for duplicators. Duplicators only consume one register read or register write port, not both, so the total is less than the sum of the parts. The * notation indicates the addition of one read port for each remote replicate.

Figure 16:
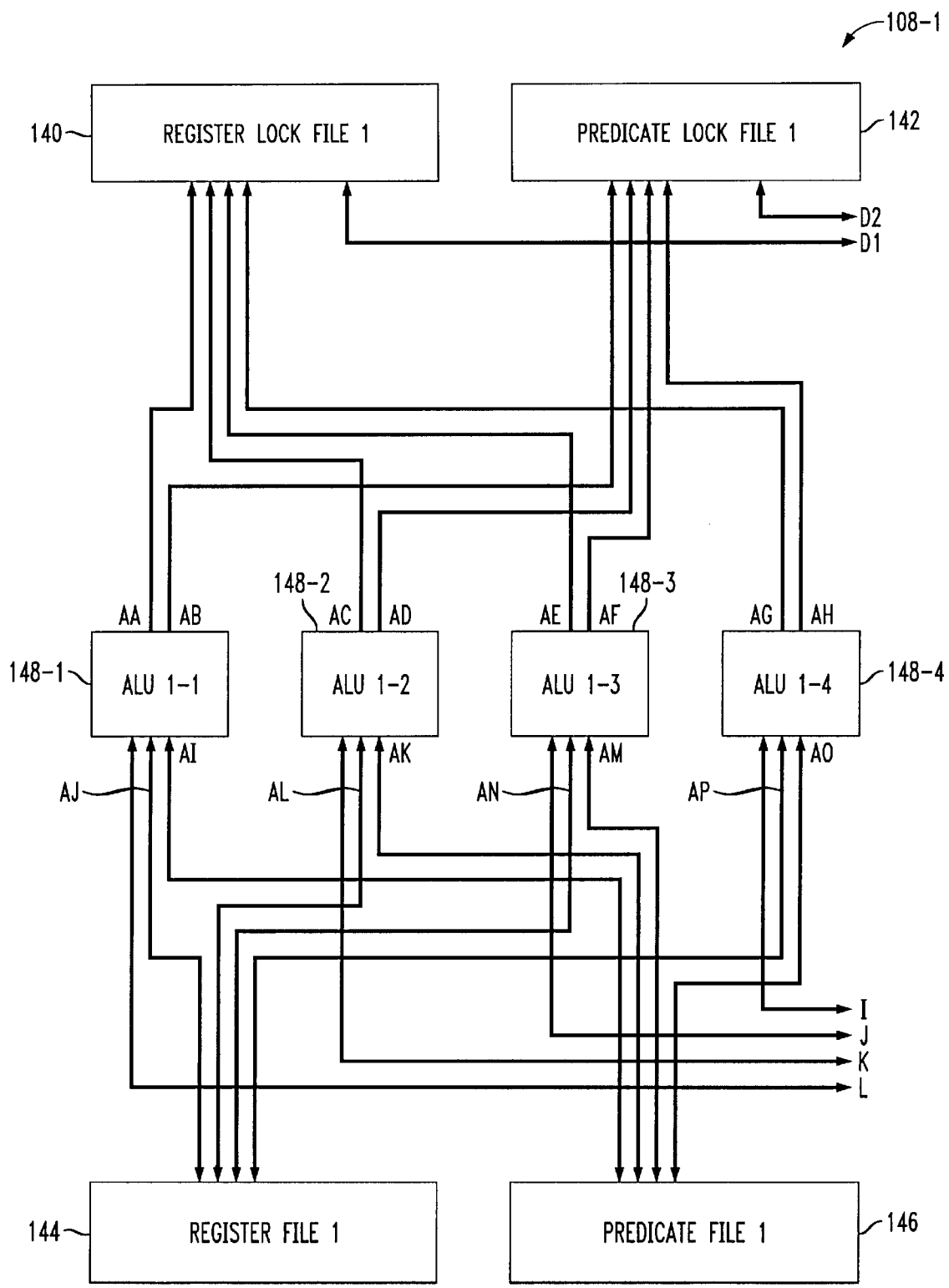
FIGS. 16 and 17 show the one of the clusters of the FIG. 12 processor in greater detail for cooperative interconnection embodiments of the invention utilizing augmented ALUs and dedicated interface units, respectively.
Figure 17:
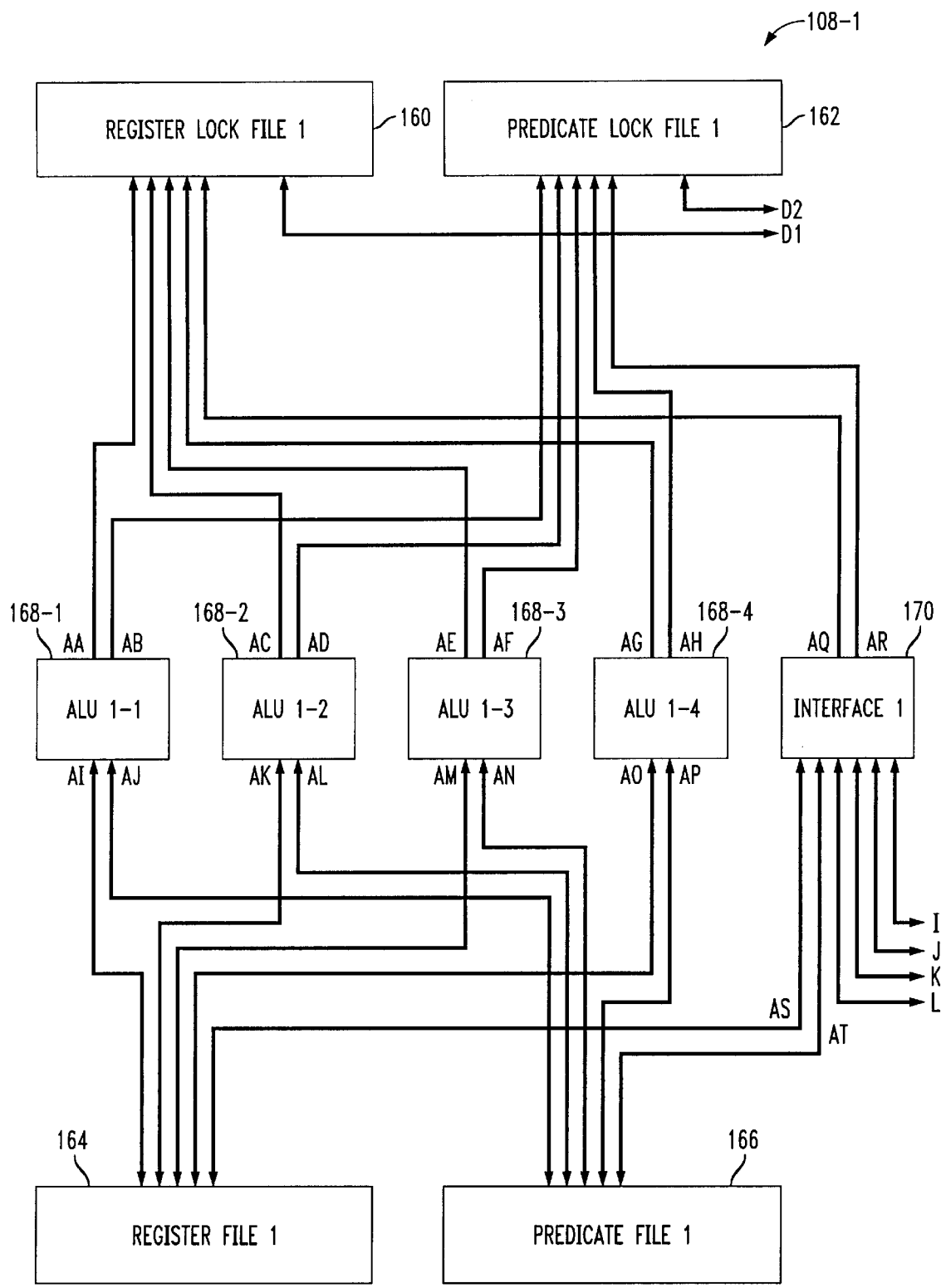

FIGS. 16 and 17 show the clusters 108-1 in greater detail for cooperative interconnection embodiments of the invention utilizing augmented ALUs, i.e., ALU+ units and dedicated interface units, respectively. The organization using cooperative interconnection with ALU+ units has all ALU units modified to be ALU+ units. The organization using cooperative interconnection with interface units has one interface unit added to each cluster. These organizations do not allow any units other than the decode unit 106 and local units access to the register files.

Referring to FIG. 16, the cluster 108-1 in the augmented ALU embodiment includes a register lock file 140, a predicate lock file 142, a register file 144 and a predicate file 146. The cluster 108-1 also includes four ALUs 148-1, 148-2, 148-3 and 148-4, arranged as shown. As was the case in the FIG. 13 example, the connections of the ALUs in FIGS. 16 and 17 to other clusters or replicated files are not shown for simplicity of illustration. Only connections which affect cluster 108-1 port requirements are shown.

For the typical cluster 108-1, the changes in port requirements in the FIG. 16 ALU+ cooperative interconnection example, relative to the previously-described invariant port requirements, include the following:

Ala. 3 register read ports
AKa. 3 register read ports
AMa. 3 register read ports
AOa. 3 register read ports
I1,I2,J1,J2,K1,K2,L1,L2. No connections. With cooperative interconnections, remote clusters do not need information about local cluster locks; the local cluster takes care of locking.
I3,I4,J3,J4,K3,K4,L3,L4. Paths are from ALU+ units to remote clusters. No register file ports are required.

Referring to FIG. 17, the cluster 108-1 in the interface unit cooperative interconnection embodiment includes a register lock file 160, a predicate lock file 162, a register file 164 and a predicate file 166. The cluster 108-1 also includes four ALUs 168-1, 168-2, 168-3 and 168-4, arranged as shown. A dedicated interface unit 170 is included in the cluster 108-1. The changes in port requirements in the FIG. 17 interface unit cooperative interconnection example, relative to the previously-described invariant port requirements, include the following:

D1a. 15 register lock read ports in cluster 108-1 to decode unit 106 due to instructions destined for cluster 108-1.
D1b. 5 register lock write ports in cluster 108-1 to decode unit 106 due to instructions destined for cluster 108-1.
D2a. 14 predicate lock read ports in cluster 108-1 to decode unit 106 due to instructions destined for cluster 108-1.
D2b. 5 predicate lock write ports in cluster 108-1 to decode unit 106 due to instructions destined for cluster 108-1.
Ala. 2 register read ports
AKa. 2 register read ports
AMa. 2 register read ports
AOa. 2 register read ports
AQ. 1 register lock write port
AR. 1 predicate lock write port
ASa. 3 register read ports
ASb. 1 register write port
ATa. 1 predicate read port
ATb. 1 predicate write port
I1,I2,J1,J2,K1,K2,L1,L2. No connections. With cooperative interconnections, remote clusters do not need information about local cluster locks; the local cluster takes care of locking.
I3,I4,J3,J4,K3,K4,L3,L4. Paths are from interface units to remote clusters. No register file ports are required.

TABLE 6 below summarizes the total port requirements associated with the examples of FIGS. 12 through 17. It is apparent from TABLE 6 that the invention can provide significant reductions in port pressure relative to conventional fully-connected, write-only interconnect and read-only interconnect organizations.

TABLE 6

Summary of Port Requirements in Examples of FIGS. 12–17

| Fully Connected | Write-only | Write-only Replicated | Read-only | Read-only Replicated | Dupl. | Coop. ALU+ | Coop. Interface |
|---|---|---|---|---|---|---|---|
| Register Lock Total | | | | | | | |
| 112 | 88 | 52 | 76 | 31 | 64 | 20 | 25 |
| Predicate Lock Total | | | | | | | |
| 88 | 64 | 44 | 52 | 23 | 44 | 20 | 24 |
| Register Total | | | | | | | |
| 72 | 48 | 48 | 60 | 19 | 40 | 16 | 16 |
| Predicate Total | | | | | | | |
| 56 | 32 | 32 | 44 | 15 | 28 | 12 | 14 |

The present invention may be configured to meet the requirements of a variety of different processing applications and environments, using any desired type of clustered processor. The above-described embodiments of the invention are therefore intended to be illustrative only. Numerous alternative embodiments within the scope of the following claims will be apparent to those skilled in the art.

What is claimed is:

1. A method of reducing port pressure in a clustered processor, the clustered processor including a plurality of clusters of execution units, with each of the clusters having a portion of a processor storage element associated therewith, such that a given cluster is permitted to write to and read from its associated portion of the storage element, the method comprising the steps of:

executing an inter-cluster move instruction specifying a source cluster and a destination cluster in the plurality of clusters, the inter-cluster move instruction being executed in part by a first execution unit in the source cluster and in part by a second execution unit in the destination cluster; and transmitting a value from the source cluster to the destination cluster in response to the inter-cluster move instruction.

2. The method of claim 1 wherein the storage element includes at least one of a register file and a predicate file.

3. The method of claim 1 wherein the storage element includes at least one of a register lock file and a predicate lock file.

4. The method of claim 1 wherein the transmitting step includes sending the value over a designated interconnect structure within the processor.

5. The method of claim 1 wherein the executing step includes separating the inter-cluster move instruction into two sub-instructions, one of which is executed by a unit in the source cluster, and another of which is executed by a unit in the destination cluster.

6. The method of claim 5 wherein the sub-instructions each specify a common interconnect structure within the processor.

7. The method of claim 5 wherein at least one of the units in the source and the destination clusters is an augmented arithmetic logic unit.

8. The method of claim 5 wherein at least one of the units in the source and the destination clusters is an interface unit.

9. The method of claim 1 wherein each of the clusters includes a designated number of arithmetic logic units.

10. A clustered processor comprising:

a plurality of clusters of execution units, with each of the clusters having a portion of a processor storage element associated therewith, such that a given cluster is permitted to write to and read from its associated portion of the storage element;

wherein the processor executes an inter-cluster move instruction specifying a source cluster and a destination cluster in the plurality of clusters, the inter-cluster move instruction being executed in part by a first execution unit in the source cluster and in part by a second execution unit in the destination cluster, such that a value is transmitted from the source cluster to the destination cluster in response to the inter-cluster move instruction.

11. The processor of claim 10 wherein the storage element includes at least one of a register file and a predicate file.

12. The processor of claim 10 wherein the storage element includes at least one of a register lock file and a predicate lock file.

13. The processor of claim 10 further including a designated interconnect structure for sending the value from the source cluster to the destination cluster.

14. The processor of claim 10 wherein the processor is further operative to separate the inter-cluster move instruction into two sub-instructions, one of which is executed by a unit in the source cluster, and another of which is executed by a unit in the destination cluster.

15. The processor of claim 14 wherein the sub-instructions each specify a common interconnect structure within the processor.

16. The processor of claim 14 wherein at least one of the units in the source and the destination clusters is an augmented arithmetic logic unit.

17. The processor of claim 14 wherein at least one of the units in the source and the destination clusters is an interface unit.

18. The processor of claim 10 wherein each of the clusters includes a designated number of arithmetic logic units.

19. A clustered processor comprising:

a memory for storing instructions;

a fetch unit for retrieving instructions from the memory;

a decode unit for decoding the retrieved instructions; and a plurality of clusters of execution units coupled to the decode unit, with each of the clusters having a portion of a processor storage element associated therewith, such that a given cluster is permitted to write to and read from its associated portion of the storage element;

wherein the processor executes an inter-cluster move instruction specifying a source cluster and a destination cluster in the plurality of clusters, the inter-cluster move instruction being executed in part by a first execution unit in the source cluster and in part by a second execution unit in the destination cluster, such that a value is transmitted from the source cluster to the destination cluster in response to the inter-cluster move instruction.

20. A method of reducing port pressure in a clustered processor, the clustered processor including a plurality of clusters of execution units, with each of the clusters having a portion of a processor storage element associated therewith, such that a given cluster is permitted to write to and read from its associated portion of the storage element, the method comprising the steps of:

executing an inter-cluster move instruction specifying a source cluster and a destination cluster in the plurality of clusters, the inter-cluster move instruction being separated for execution into a first portion and a second portion, the first portion being executed in one or more execution units of the source cluster substantially simultaneously with execution of the second portion in one or more execution units of the destination cluster; and transmitting a value from the source cluster to the destination cluster in response to the inter-cluster move instruction.

21. A clustered processor comprising:

a plurality of clusters of execution units, with each of the clusters having a portion of a processor storage element associated therewith, such that a given cluster is permitted to write to and read from its associated portion of the storage element;

wherein the processor executes an inter-cluster move instruction specifying a source cluster and a destination cluster in the plurality of clusters, the inter-cluster move instruction being separated for execution into a first portion and a second portion, the first portion being executed in one or more execution units of the source cluster substantially simultaneously with execution of the second portion in one or more execution units of the destination cluster, such that a value is transmitted from the source cluster to the destination cluster in response to the inter-cluster move instruction.

22. A clustered processor comprising:

a memory for storing instructions;

a fetch unit for retrieving instructions from the memory;

a decode unit for decoding the retrieved instructions; and a plurality of clusters of execution units coupled to the decode unit, with each of the clusters having a portion of a processor storage element associated therewith, such that a given cluster is permitted to write to and read from its associated portion of the storage element;

wherein the processor executes an inter-cluster move instruction specifying a source cluster and a destination cluster in the plurality of clusters, the inter-cluster move instruction being separated for execution into a first portion and a second portion, the first portion being executed in one or more execution units of the source cluster substantially simultaneously with execution of the second portion in one or more execution units of the destination cluster, such that a value is transmitted from the source cluster to the destination cluster in response to the inter-cluster move instruction.

* * * * *